C. E. LORD.
DYNAMO ELECTRIC MACHINE.
APPLICATION FILED SEPT. 24, 1906.
1,005,858.
Patented Oct. 17, 1911.
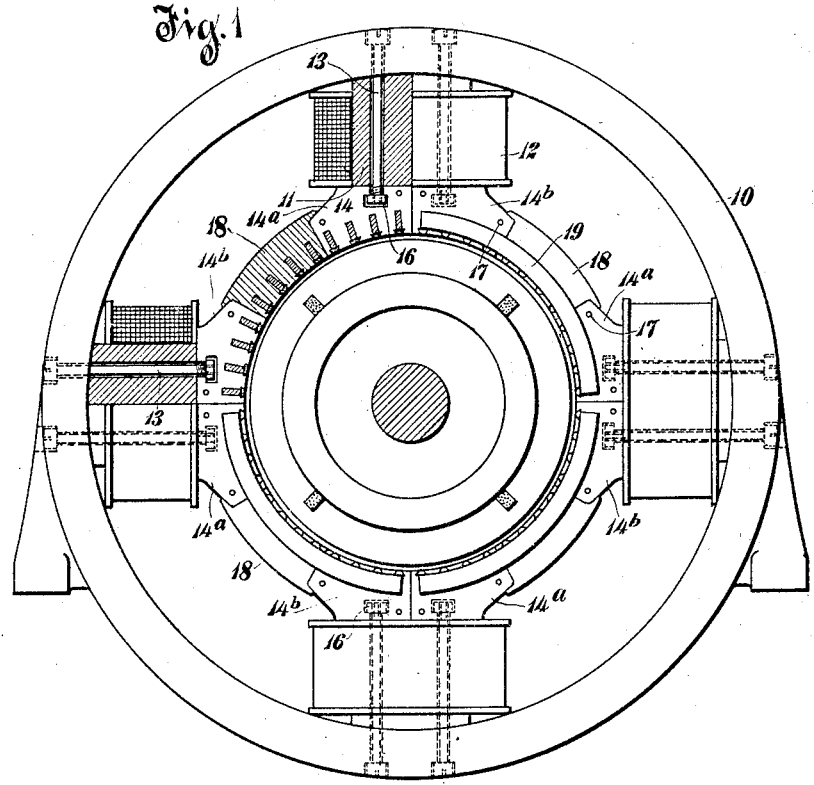
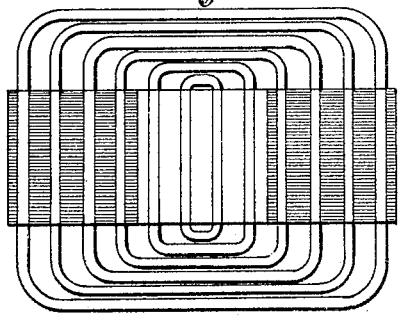
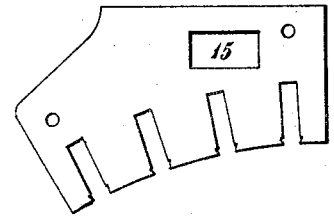

UNITED STATES PATENT OFFICE.

CHARLES E. LORD, OF NORWOOD, OHIO, ASSIGNOR TO ALLIS-CHALMERS COMPANY, A CORPORATION OF NEW JERSEY.

DYNAMO-ELECTRIC MACHINE.

1,005,858.   Specification of Letters Patent.   Patented Oct. 17, 1911.

Application filed September 24, 1906. Serial No. 336,024.

*To all whom it may concern:*

Be it known that I, CHARLES E. LORD, a citizen of the United States, residing at Norwood, in the county of Hamilton and State of Ohio, have invented certain new and useful Improvements in Dynamo-Electric Machines, of which the following is a full, clear, and exact specification.

My invention relates to dynamo-electric machines.

It is customary to provide field members of dynamo-electric machines with auxiliary field windings to prevent sparking at the brushes. These auxiliary field windings may be arranged on poles intermediate the main field windings or may be distributed in slots in the inner faces of the pole shoes. In the latter construction the windings extend between adjacent poles, each pole shoe having windings which extend to the adjacent shoe on each side. It is also customary to provide bridging members between the pole tips which bridging members are also slotted to receive the windings so that the windings are equally distributed around the field. In machines provided with distributed auxiliary windings, it is rather a difficult matter to remove the main field coils and also the auxiliary field coils in case repairs are necessary, or to remove one portion of the field frame from the other, since the poles are bridged by the auxiliary windings.

The object of my invention is to provide means whereby the auxiliary field windings or a portion of the same may be easily removed for any purpose such as for repairs to the auxiliary winding or main field coils or to permit one portion of the frame to be removed.

In carrying out my invention I provide removable pole shoes which are split or divided into two portions so that one portion and the winding thereon may be removed from the other.

More specifically considered my invention consists in a dynamo-electric machine having removable laminated pole shoes divided into two parts along the center of the pole, which pole shoes are provided with non-magnetic bridging members, the pole shoes and bridging members being slotted for the reception of an auxiliary field winding. The coils of the auxiliary winding are arranged in groups, each group being located in the slots of the adjacent sections or halves of the pole shoes of adjacent poles and the non-magnetic bridging member between the poles, so that each group of coils can easily be removed by removing the pole shoe sections.

My invention still further consists in the details of construction and the combinations and arrangements of parts described in the specification and set forth in the appended claim.

For a better understanding of my invention, reference is had to the accompanying drawings in which—

Figure 1 is an end elevation of the machine equipped with my invention, parts being in section and removed; Fig. 2 is an elevation of a lamina of one of the halves of a pole shoe; and Fig. 3 is a face view of one group of coils of the auxiliary winding and of the slotted parts in which the coils are located.

Referring now to the figures of the drawing, I have shown at 10 the field frame of a dynamo-electric machine provided with field poles 11 carrying main field coils 12. I have in this case shown a four pole machine but it is evident that my invention can as well be applied to a machine having a greater or less number of poles. The field poles 11 may be either integral with the field frame or separable therefrom. In this case I have shown removable field poles, the latter being secured to the field frame by bolts 13. At the end of each field pole is a removable pole shoe 14 each consisting of two halves or sections 14ª and 14ᵇ, which are in engagement with each other along the center line of the pole. The pole shoe sections may be secured to the field poles in any suitable manner. In this case they are secured thereto by the bolts 13 which hold field poles 11 in place. In this instance the pole shoe sections are each provided with a recess or opening 15 in which is located a nut or bar 16 threaded to receive the threaded ends of the bolts as shown. The recesses 15 are preferably located in the body of the pole shoes, the inner laminæ being provided with punched openings as shown in Fig. 2. The laminæ of the pole shoes are preferably held together by rivets 17. Located between adjacent pole shoes are bridging members 18 made preferably of non-magnetic material. The pole shoes and bridging members 18 are in this case provided with slots for the reception of distributed auxiliary field windings 19 for preventing sparking at the brushes, as clearly shown in the drawing. The auxiliary windings consist of coils arranged in groups, the coils of each group being located in the slots of the two adjacent pole shoe sections 14ª and 14ᵇ of adjacent poles, and the slots of the bridging member between such sections. This construction of the pole shoes and arrangements of the auxiliary windings permits the ready removal of any section of the auxiliary winding, for the reason that the pole shoe sections in which the coils of each group are located can be detached from the machine without otherwise disturbing the remaining pole shoe sections. Thus, if it is desired to remove one section of the auxiliary winding, the proper bolts 13 extending into the corresponding pole shoe sections are removed permitting said sections and the intermediate bridging member 18 and the group of coils to be removed. In case it is desired to repair the auxiliary winding, the injured portion can be removed by removing one or more groups of coils. If it is desired to remove a field coil the pole shoe sections at the ends of the pole are detached from the pole by removing the bolts 13, thereby permitting the field coil and pole to be withdrawn from the machine in a direction parallel to the axis of rotation, without affecting the position of said auxiliary winding.

In machines constructed according to my invention the removal of one portion of the frame from another is an easy matter for the reason that the groups of coils bridging the poles, between which the divisions of the frame occur, can be easily removed.

I do not wish to be confined to the details shown as many changes and modifications can be made without departing from the spirit and scope of my invention. For example I do not wish to be confined to the use of bridging members between the pole pieces as these may, if desired, be omitted. Also other means may be shown for securing the pole shoes to the pole pieces.

What I claim as new and desire to secure by Letters Patent is:—

In a dynamo-electric machine, a field frame, field poles removable from said frame, removable pole shoes on said field poles, each of said pole shoes being divided along the center line of the pole, bridging members connecting adjacent pole shoes on adjacent field poles, main field coils on said field poles, a rigid distributed auxiliary field winding, said winding being arranged in groups of rigid coils mounted upon adjacent pole shoe sections of adjacent poles, and means for fastening said pole shoe sections independently to their corresponding poles, whereby a field pole and its field coil may be removed from the frame without affecting the position of the frame or of the auxiliary winding or pole shoes.

In testimony whereof I affix my signature, in the presence of two witnesses.

CHARLES E. LORD.

Witnesses:
ARTHUR F. KWIS.
FRED J. KINSEY.